United States Patent
Salter et al.

(10) Patent No.: US 12,223,727 B2
(45) Date of Patent: Feb. 11, 2025

(54) OBJECT DETECTION AROUND VEHICLE CHARGING STATIONS

(71) Applicant: Ford Global Technologies, LLC, Dearborn, MI (US)

(72) Inventors: Stuart C. Salter, White Lake, MI (US); Brendan Francis Diamond, Grosse Pointe, MI (US); Timilehin Ogunbekun, Livonia, MI (US); John Robert Van Wiemeersch, Novi, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 262 days.

(21) Appl. No.: 17/830,557

(22) Filed: Jun. 2, 2022

(65) Prior Publication Data

US 2023/0391216 A1    Dec. 7, 2023

(51) Int. Cl.

| | |
|---|---|
| *G06V 20/52* | (2022.01) |
| *B60L 53/14* | (2019.01) |
| *B60L 53/37* | (2019.01) |
| *G06V 20/00* | (2022.01) |
| *G06V 20/40* | (2022.01) |
| *G06V 40/10* | (2022.01) |
| *G08G 1/14* | (2006.01) |
| *G08G 1/16* | (2006.01) |

(52) U.S. Cl.
CPC ............. *G06V 20/52* (2022.01); *B60L 53/37* (2019.02); *G06V 20/38* (2022.01); *G06V 20/44* (2022.01); *G06V 40/103* (2022.01); *G08G 1/146* (2013.01); *G08G 1/149* (2013.01); *G08G 1/164* (2013.01); *B60L 53/14* (2019.02)

(58) Field of Classification Search
CPC ........ G06V 20/52; G06V 20/38; G06V 20/44; G06V 40/103; B60L 53/37; B60L 53/14; G08G 1/146; G08G 1/149; G08G 1/164
See application file for complete search history.

(56) References Cited

U.S. PATENT DOCUMENTS

| | | | |
|---|---|---|---|
| 10,737,689 B2 * | 8/2020 | Kim ...................... | B60W 30/06 |
| 11,052,778 B2 | 7/2021 | McCool et al. | |
| 11,125,577 B2 * | 9/2021 | Alneghaimish .. | G08G 1/096816 |
| 11,155,177 B2 * | 10/2021 | Li ........................... | B60L 53/30 |
| 11,254,218 B2 * | 2/2022 | Haneda ................... | B60L 53/65 |

(Continued)

*Primary Examiner* — Dale W Hilgendorf
(74) *Attorney, Agent, or Firm* — Frank Lollo; Brooks Kushman P.C.

(57) ABSTRACT

A plurality of vehicle charging stations and a plurality of stationary sensors with respective fields of view can be disposed within an area. A stationary node computer including a first processor and a first memory and communicatively can be coupled to the charging station and the stationary sensors, the first memory storing instructions executable by the first processor such that the stationary computer is programmed to authorize a request from a vehicle to access the charging station; identify an object, detected in the area in data from one or more of the stationary sensors, to be tracked with respect to the vehicle; wherein the object to be tracked with respect to the vehicle is identified based on a type of the object, an attribute of the object and an attribute of the vehicle; and transmit data about the object to the vehicle.

20 Claims, 5 Drawing Sheets

(56) References Cited

U.S. PATENT DOCUMENTS

| | | | | |
|---|---|---|---|---|
| 11,325,586 | B2* | 5/2022 | Nakata | B60W 60/001 |
| 11,332,123 | B2* | 5/2022 | Yamazaki | G08G 1/00 |
| 11,370,457 | B2* | 6/2022 | Hara | B62D 15/0285 |
| 11,472,400 | B2* | 10/2022 | Noguchi | B60W 60/0025 |
| 11,571,977 | B2* | 2/2023 | Jung | B60L 53/68 |
| 11,584,241 | B2* | 2/2023 | Karri | B60L 3/0092 |
| 11,651,687 | B2* | 5/2023 | Sugano | G08G 1/096833 701/26 |
| 2011/0127944 | A1* | 6/2011 | Saito | B60L 53/11 320/109 |
| 2013/0193921 | A1* | 8/2013 | George | B60L 53/68 320/109 |
| 2016/0046198 | A1* | 2/2016 | Krammer | G05D 1/0246 701/22 |
| 2016/0140846 | A1* | 5/2016 | Outwater | G08G 1/144 340/932.2 |
| 2016/0352113 | A1* | 12/2016 | Zhao | B60L 53/14 |
| 2017/0309177 | A1* | 10/2017 | Hoffmann | G08G 1/148 |
| 2017/0337448 | A1* | 11/2017 | Ng | G06F 18/2431 |
| 2018/0053422 | A1* | 2/2018 | Altinger | G08G 1/149 |
| 2018/0189683 | A1* | 7/2018 | Newman | B60L 58/12 |
| 2019/0039465 | A1* | 2/2019 | Jang | B60L 53/665 |
| 2019/0275898 | A1* | 9/2019 | Haneda | G08G 1/146 |
| 2020/0001863 | A1* | 1/2020 | Li | B60W 60/001 |
| 2020/0156493 | A1* | 5/2020 | Li | H02J 7/007192 |
| 2020/0198620 | A1* | 6/2020 | Nakata | B60W 60/0053 |
| 2020/0312144 | A1* | 10/2020 | Noguchi | G08G 1/143 |
| 2020/0372143 | A1* | 11/2020 | Hirsch | B60L 53/60 |
| 2021/0039513 | A1* | 2/2021 | Konrardy | G01C 21/3415 |
| 2021/0078601 | A1* | 3/2021 | Sugano | G08G 1/146 |
| 2021/0237595 | A1* | 8/2021 | Jung | G06Q 50/40 |
| 2022/0024494 | A1* | 1/2022 | Bonanni | B60L 53/14 |
| 2022/0063433 | A1* | 3/2022 | Lu | B60L 58/12 |
| 2022/0073057 | A1* | 3/2022 | Sakai | H02J 50/10 |
| 2022/0089043 | A1* | 3/2022 | Karri | B60L 53/35 |
| 2022/0181887 | A1* | 6/2022 | Baldasare | G08B 21/182 |
| 2022/0274592 | A1* | 9/2022 | Ma | B60W 60/0025 |
| 2023/0166617 | A1* | 6/2023 | Lee | B60L 53/67 701/22 |

* cited by examiner

OBJECT DETECTION AROUND VEHICLE CHARGING STATIONS

Currently a small percentage of vehicles operating on roads are powered by electric batteries. However, this percentage is growing and is expected to continue to grow significantly. Electric vehicles require batteries to be recharged, and may need to be recharged at public charging stations. Technology is emerging for the architecture and operation of charging station systems.

DESCRIPTION

System

Figure 1:
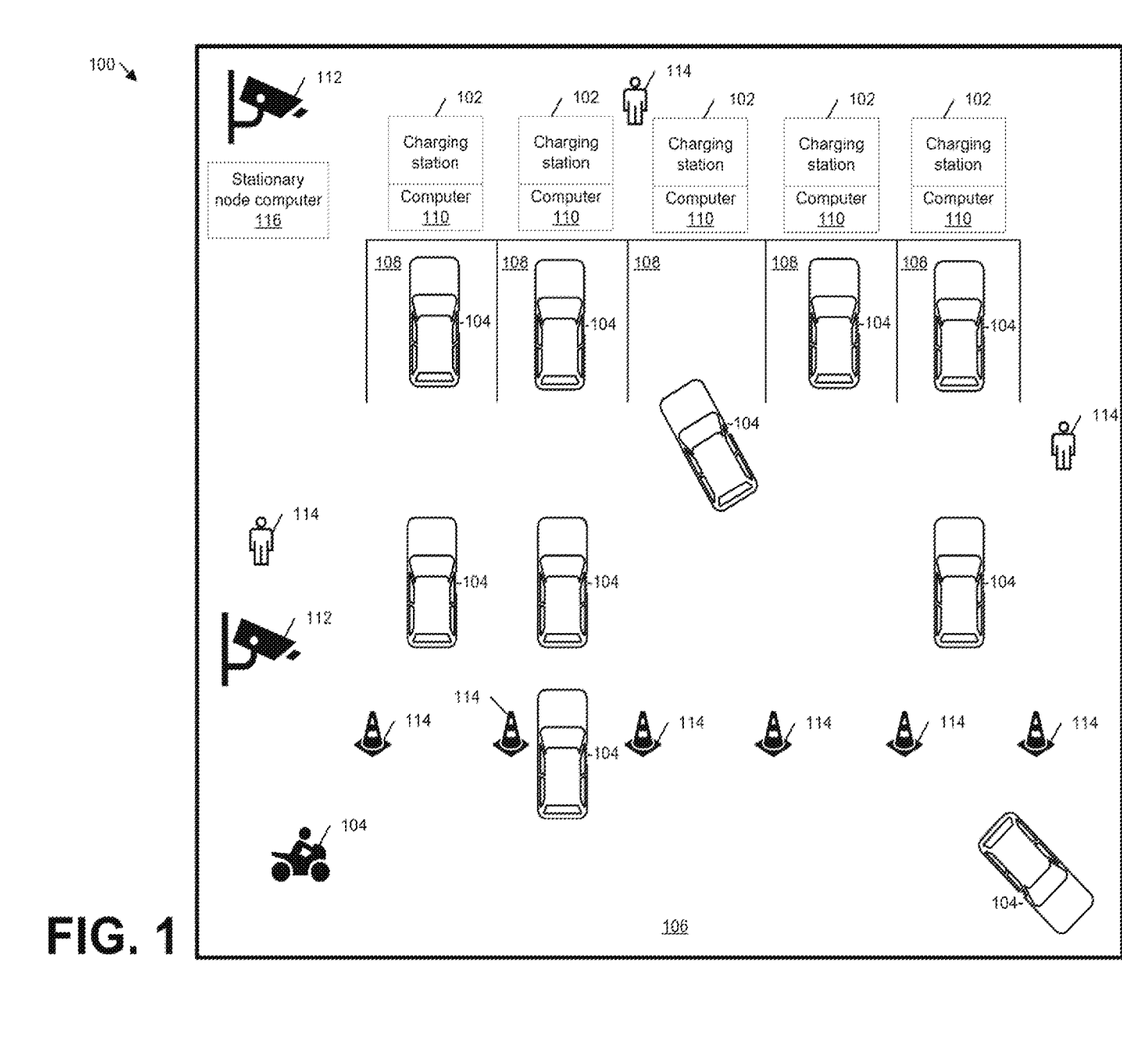
FIG. 1 is a block diagram of a charging station system.
Figure 2:
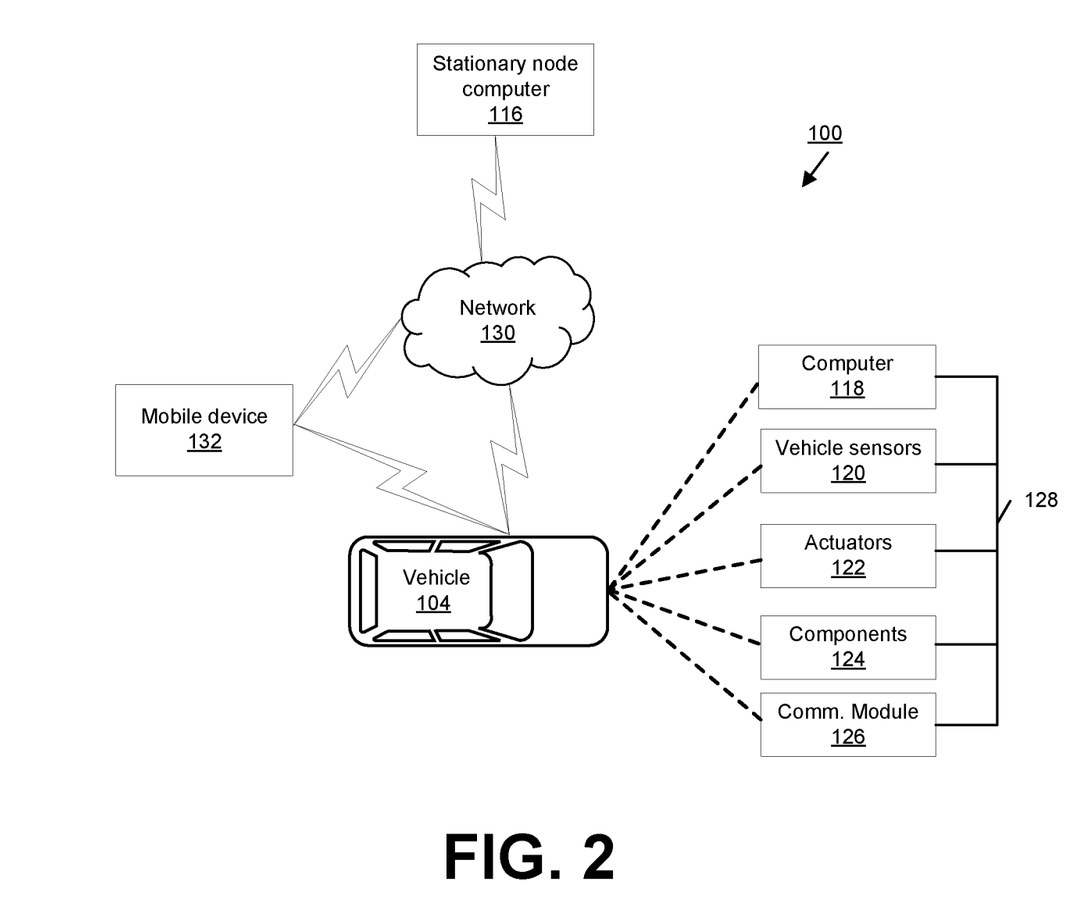
FIG. 2 is a block diagram of additional details of the charging station system of FIG. 1, including details of vehicles in the charging station system.

Referring initially to FIGS. 1 and 2, described herein is an architecture for a vehicle charging station system 100, and various processes and techniques that can be carried out in the vehicle charging station system 100 to facilitate provision of data to vehicles 104 and user devices in an area 106 of the charging station system 100, as well as to facilitate actuation of various components 124 of the charging station system 100 and/or vehicles 104 in the area 106 of the charging station system 100.

The vehicle 104 charging station system 100 can provide one or more charging stations 102 to accommodate vehicles 104 with electric batteries to be recharged. An area 106 of the charging station system 100 can be defined, e.g., as a perimeter (an illustrative example of which is the rectangle shown encompassing other elements described in FIG. 1) encompassing the charging stations 102 and other elements of the charging station system 100. The area 106 can include one or more sub-areas corresponding to respective charging stations 102. That is, the sub-areas are provided as areas 106 in which vehicles 104 can be parked while receiving electrical charge for their batteries from a respective charging station 102. The charging station system area 106 can also include a region in which vehicles 104 may park and/or travel, e.g., while awaiting access to a charging station 102, to park to visit some other facility of the charging station 102, to enter and exit the area 106, etc. The area 106 and subareas 108 of the charging station system 100, and any other regions thereof, can be defined according to location coordinates, a geo-fence, or any other suitable mechanism for defining location boundaries.

The respective one or more charging stations 102 in the charging station system 100 can use any suitable mechanism for recharging batteries of vehicles 104, e.g., a plug-in connection, inductive charging, etc. Further, a charging station 102 typically includes a charging station computer 110. In addition, although not shown in the drawings, the respective charging stations 102 can include one or more sensors, e.g., cameras, ultrasonic sensors, radars, etc. for detecting objects 114 (i.e., physical or material things) such as pedestrians, obstacles, bicycles, etc. Vehicles 104 are denoted with a separate reference sign to facilitate the present description, but are included within the definition of objects 114.

For example, the charging station 102 can receive sensor data to determine whether a vehicle 104 is in its respective subarea 108, and/or whether the vehicle 104 is properly positioned or oriented in the subarea 108. The charging station computers 110 can be in communication with sensors, with each other, and/or with a stationary node computer 116 via any suitable communication mechanisms and/or protocols, e.g., ethernet, IEEE 802.11 (commonly referred to as WI-FI®), Bluetooth®, etc. In some implementations, a separate stationary node computer 116 may be omitted, and operations described herein to the stationary node computer 116 may be carried out by one or more of the charging station computers 110. The stationary node computer 116 and each charging station computer 110 typically include respective processors and memories, and may be implemented in various suitable ways, such as described further below with respect to a vehicle computer 118.

The vehicle charging station system 100 can include a plurality of stationary sensors 112, whether mounted to specific charging stations 102 and/or with fields of view of specific subareas 108, or independent of any specific subarea 108, and with fields of view including portions of the area 106 other than, or in addition to, including one or more subareas 108. For example, the vehicle charging station system 100 typically includes one or more sensors, e.g., cameras, mounted with respective fields of view so as to cover some or all of the area 106 other than or in addition to the subareas 108.

The stationary sensors 112, as well as vehicle sensors 120, mentioned below, can include various devices that provide analog and/or digital data measuring or describing physical phenomena. "Data" herein means information that can be processed and/or stored by a digital computer. Data can be provided and/or represented in a variety of formats, e.g., binary, hexadecimal, alphanumeric e.g., ASCII, etc. Examples of stationary sensors 112 that may be included in the charging station system 100 include still and/or video cameras, lidars, radars, and/or ultrasonic sensors. These and other sensors are described further below with respect to vehicle sensors 120.

The charging station system 100, as mentioned above, includes at least one, and may include a plurality of, charging stations 102, and may accommodate recharging of batteries of a plurality of vehicles 104. A vehicle 104 accessing the charging station system 100 may be any type of ground vehicle 104 with two or more wheels, e.g., a motorcycle or motorbike, passenger or commercial automobile such as a sedan, a coupe, a truck, a sport utility, a crossover, a van, a minivan, a taxi, a bus, etc., that includes batteries that can be recharged by a charging station 102.

Vehicles 104 typically include one or more vehicle computers 118. A vehicle computer 118 (and other computers discussed herein) includes a processor and a memory. The memory includes one or more forms of computer readable media, and stores instructions executable by the vehicle computer 118 for performing various operations, including as disclosed herein. For example, a vehicle computer 118 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, a vehicle computer 118 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components 124 inside an FPGA may be configured based on VHDL programming, e.g. stored in a memory electrically connected to the FPGA circuit. In some examples, a combination of processor(s), ASIC(s), and/or FPGA circuits may be included in a computer.

The memory can be of any type, e.g., hard disk drives, solid state drives, servers, or any volatile or non-volatile media. The memory can store the collected data sent from the sensors. The memory can be a separate device from the computer, and the computer can retrieve information stored by the memory via a network in the vehicle 104, e.g., over a CAN bus, a wireless network, etc. Alternatively or additionally, the memory can be part of the computer, e.g., as a memory of the computer.

The computer may include programming to command one or more actuators 122 to operate one or more vehicle 104 subsystems or components 124, such as vehicle 104 brakes, propulsion e.g., control of acceleration in the vehicle 104 by controlling one or more of an internal combustion engine, electric motor, hybrid engine, etc., steering, climate control, interior and/or exterior lights, etc., as well as to determine whether and when the computer, as opposed to a human operator, is to control such operations. Additionally, the computer may be programmed to determine whether and when a human operator is to control such operations. The computer may include or be communicatively coupled to, e.g., via a vehicle network 128 such as a communications bus as described further below, more than one processor, e.g., included in components 124 such as sensors, electronic control units (ECUs) or the like included in the vehicle 104 for monitoring and/or controlling various vehicle components, e.g., a powertrain controller, a brake controller, a steering controller, etc. The computer is generally arranged for communications on a vehicle 104 communication network that can include a bus in the vehicle 104 such as a controller area 106 network CAN or the like, and/or other wired and/or wireless mechanisms. Alternatively or additionally, in cases where the computer actually comprises a plurality of devices, the vehicle 104 communication network may be used for communications between devices represented as the computer in this disclosure. Further, as mentioned below, various controllers and/or sensors may provide data to the computer via the vehicle 104 communication network.

A sensor herein, whether a stationary sensor 112 or a vehicle sensor 120, means a device that can obtain data including one or more measurements of one or more physical phenomena. Vehicle sensors 120 and/or stationary sensors 112 could include cameras, lidar, radar, ultrasonic sensors, and various other sensors, including as described by way of example as follows. Some vehicle sensors detect internal states of the vehicle 104, for example, wheel speed, wheel orientation, and engine and transmission variables. Some vehicle sensors 120 detect the position or orientation of the vehicle 104, for example, global positioning system GPS sensors; accelerometers such as piezo-electric or microelectromechanical systems MEMS; gyroscopes such as rate, ring laser, or fiber-optic gyroscopes; inertial measurements units IMU; and magnetometers. Some sensors 112, 120 detect the external world, for example, radar sensors, scanning laser range finders, light detection and ranging LIDAR devices, and image processing sensors such as cameras. A LIDAR device detects distances to objects 114 by emitting laser pulses and measuring the time of flight for the pulse to travel to the object 114 and back. Some sensors 112, 120 are communications devices, for example, vehicle-to-infrastructure (V2I) or vehicle-to-vehicle (V2V) devices. Sensor operation can be affected by obstructions, e.g., dust, snow, insects, etc. Often, but not necessarily, a sensor 112, 120 includes a digital-to-analog converter to converted sensed analog data to a digital signal that can be provided to a digital computer, e.g., via a network. Sensors 112, 120 can include a variety of devices, and can be disposed to sense an environment, provide data about a machine, etc., in a variety of ways. For example, a stationary sensor 112 could be mounted to a stationary infrastructure element on, over, or near a road or area 106. Moreover, various controllers in a vehicle 104 may operate as vehicle sensors 120 to provide data via the vehicle network 128 or bus, e.g., data relating to vehicle 104 speed, acceleration, location, subsystem and/or component 124 status, etc. Further, other sensors 112, 120 could include cameras, short range radar, long range radar, LIDAR, and/or ultrasonic transducers, weight sensors, accelerometers, motion detectors, etc., i.e., sensors to provide a variety of data. To provide just a few non-limiting examples, sensor data could include data for determining a position of a component 124, a location of an object 114, a speed of an object 114, a type of an object 114, a slope of a roadway or surface of an area 106, a temperature, a presence or amount of moisture, a fuel level, a data rate, etc.

The vehicle computer 118 and vehicle sensors 120 and other devices such as actuators 122, a vehicle 104 communication module 126, or other vehicle components typically communicate via a vehicle network 128. A vehicle network 128 is a network via which messages can be exchanged between various devices in vehicle 104. Computer can be generally programmed to send and/or receive, via vehicle network 128, messages to and/or from other devices in vehicle 104 e.g., any or all of ECUs, sensors, actuators 122, components 124, communications module, a human machine interface HMI, etc. Additionally or alternatively, messages can be exchanged among various such other devices in vehicle 104 via vehicle network 128. In cases in which computer actually comprises a plurality of devices, vehicle network 128 may be used for communications between devices represented as computer in this disclosure. Further, as mentioned below, various controllers and/or vehicle sensors 120 may provide data to the computer. In some implementations, vehicle network 128 can be a network in which messages are conveyed via a vehicle 104 communications bus. For example, vehicle network 128 can include a controller area 106 network CAN in which messages are conveyed via a CAN bus, or a local interconnect network LIN in which messages are conveyed via a LIN bus. In some implementations, vehicle network 128 can include a network in which messages are conveyed using other wired communication technologies and/or wireless communication technologies e.g., Ethernet, WiFi®, Bluetooth®, UWB, etc. Additional examples of protocols that may be used for communications over vehicle network 128 in some implementations include, without limitation, Media Oriented System Transport MOST, Time-Triggered Protocol TTP, and FlexRay™. In some implementations, vehicle network 128 can represent a combination of multiple networks, possibly of different types, that support communications among devices in vehicle 104. For example, vehicle network 128 can include a CAN in which some devices in vehicle 104 communicate via a CAN bus, and a wired or wireless local area 106 network in which some device in vehicle 104 communicate according to Ethernet or Wi-Fi communication protocols.

A vehicle component 124 is one or more hardware components 124 adapted to perform a mechanical or electromechanical function or operation-such as moving the vehicle 104, slowing or stopping the vehicle 104, steering the vehicle 104, etc. Non-limiting examples of components 124 include a propulsion component 124 (that includes, e.g., an internal combustion engine and/or an electric motor, etc.), a transmission component 124, a steering component 124 (e.g., that may include one or more of a steering wheel, a steering rack, etc.), a suspension component 124 (e.g., that may include one or more of a damper, e.g., a shock or a strut, a bushing, a spring, a control arm, a ball joint, a linkage, etc.), a brake component 124, a park assist component 124, an adaptive cruise control component 124, an adaptive steering component 124, one or more passive restraint systems (e.g., airbags), a movable seat, etc. Components 124 can include, or can be associated with, vehicle 104 actuators 122.

A vehicle actuator 122 can be implemented via circuits, chips, or other electronic and or mechanical components 124 that can actuate various vehicle 104 subsystems in accordance with appropriate control signals as is known. Actuators 122 may be used to control braking, acceleration, and steering of a vehicles 104. A vehicle computer 118 may be programmed to actuate vehicle actuators 122 including for propulsion, steering, and/or braking components 124.

A vehicle computer 118 may be configured for communicating via a vehicle communication module 126 or interface with devices outside of the vehicle 104 such as another vehicle 104, a mobile device 132 of a user, a charging station computer 110, and/or a stationary node computer 116. The communication module 126 can employ various suitable technologies and protocols, such as through vehicle-to-vehicle (V2V) communications, vehicle-to-infrastructure or everything V2X or vehicle-to-everything including cellular communications C-V2X wireless communications cellular, DSRC, etc., to another vehicle 104, to an infrastructure element typically via direct radio frequency communications and/or typically via the network a remote server. The module could include one or more mechanisms by which the computers of vehicles 104 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth®, UWB, IEEE 802.11, dedicated short range communications (DSRC), cellular, V2X, CV2X, and the like.

Vehicle computers 118, the stationary node computer 116, and/or charging computers may further communicate via a wide area network 130. The wide area network 130 can include one or more mechanisms by which a vehicle computer 118 may communicate with, for example, a remote server. Accordingly, the network can include one or more of various wired or wireless communication mechanisms, including any desired combination of wired e.g., cable and fiber and/or wireless e.g., cellular, wireless, satellite, microwave, and radio frequency communication mechanisms and any desired network topology or topologies when multiple communication mechanisms are utilized. Exemplary communication networks include wireless communication networks e.g., using Bluetooth®, Bluetooth® Low Energy BLE, Ultra-Wideband (UWB) for Phone Localization, Peer-to-Peer communication, UWB based Radar, IEEE 802.11, vehicle-to-vehicle V2V or vehicle 104 to everything (V2X) such as cellular V2X, CV2X, Dedicated Short Range Communications (DSRC), etc., local area 106 networks (LAN), and/or wide area networks 130 (WAN), including the Internet, providing data communication service.

A mobile device 132 means a computer, e.g., a smart phone or the like, typically includes a processor and a memory that may be implemented as described above, and that is portable, i.e., may be carried by a user.

Example Operations

The stationary node computer 116 and/or the charging station computer 110 can authorize a request from a vehicle 104 to access a charging station 102. As mentioned above, it is to be understood that, when reference is herein made to the stationary node computer 116, operations being carried out could be carried out by the stationary node computer 116 alone, a charging station computer 110, or some combination thereof. The request and response thereto can use various suitable communications mediums, including V2I or V2X technologies. For example, if vehicle computer 118 could cause a request to be sent via a wide area network 130 according to cellular technology, the request then being provided to the stationary node computer 116, which could similarly respond with the authorization. For example, the stationary node computer 116 could store a list or registry of vehicles 104 permitted to use the charging station system 100, or could access such registry or request authorization of such registry from a remote computer (not shown) via the wide area network 130. Alternatively or additionally, a vehicle 104 could make a request of the stationary node computer 116 to use the charging station system 100, and the stationary node computer 116 could respond with an authorization based on availability, a type of charger specified by the requesting vehicle, and/or other suitable factors. Yet further alternatively or additionally, the stationary node computer 116 could detect, via data from stationary sensors 112 in the area 106, that a vehicle 104 is approaching or entering the area 106. The vehicle 104 could be identified via various mechanisms, e.g., detecting a license plate number in an image of the vehicle 104, whereupon, if the vehicle 104 is recognized, the stationary node computer 116 could then transmit the authorization to the vehicle 104. Typically, the authorization includes an identification, e.g., a location, an identification number, etc., of a charging station 102 for the vehicle 104 to use.

A stationary node computer 116 can detect objects 114 in data provided from stationary sensors 112 monitoring their respective fields of view. The stationary node computer 116 can further identify an object 114, detected in the area 106 in data from one or more of the stationary sensors 112, to be tracked with respect to a particular vehicle 104. Tracking an object 114 with respect to a vehicle 104 in the context of this disclosure means that data from stationary sensors 112 and/or vehicle sensors 120 received in the stationary node computer 116 is used to determine data about the object 114 including a location, speed, and/or direction (which altogether would constitute a trajectory) of the object 114, and that the data about the object 114 is then compared to location, speed, and/or direction data about the particular vehicle 104 so that a risk of the object 114 with respect to the vehicle 104 can be evaluated. Tracking the object 114 with respect to the vehicle 104 can yet further mean, as described more below, that the stationary node computer 116 continues to identify the object 114 as being tracked with respect to the vehicle 104 so long as a comparison of data about the object 114 to data about the vehicle 104 meets criteria for the tracking, such as the object 114 being within a specified distance of the vehicle 104, the object 114 moving according to a trajectory indicating tracking (e.g., toward the vehicle 104), and/or the object 114 being of a type indicated for tracking (e.g., a pedestrian as opposed to an unattended shopping cart), etc. Tracking an object 114 with respect to a vehicle 104 can further mean, as described more below, that the data about the object 114 is provided to the vehicle 104, e.g., data about a location, type, speed, direction, and/or data showing an image of the object 114, etc.

The stationary node computer 116 can receive stationary sensor 112 data, e.g., video image data, of the environment around the vehicle 104. The image data can include one or more objects 114 around the vehicle 104. For example, a computer such as the stationary node computer 116 can be programmed to classify and/or identify objects 114, based on sensor data. For example, object classification techniques can be used, e.g., in the vehicle computer 118 based on lidar sensor data, camera sensor data, etc., to classify a detected object 114, as mobile or stationary, i.e., non-movable. Additionally, or alternatively, object identification techniques can be used, e.g., based on lidar sensor data, camera sensor data, etc., to identify a type of object 114, e.g., a vehicle 104, a pedestrian object 114, etc., as well as physical features of objects 114. Non-limiting examples of objects 114 include a pedestrian, another vehicle 104, a bicycle, a traffic cone, a shopping cart, a pole, etc. Various techniques may be suitable to interpret sensor data and/or to classify objects 114, based on sensor data. For example, camera and/or lidar image data can be provided to a classifier that comprises programming to utilize one or more conventional image classification techniques. For example, the classifier can use a machine learning technique in which data known to represent various objects 114, is provided to a machine learning program for training the classifier. Once trained, the classifier can accept as input sensor data, e.g., an image, and then provide as output, for each of one or more respective regions of interest in the image, an identification and/or a classification i.e., mobile or stationary of one or more objects 114, or an indication that no object 114, is present in the respective region of interest. Further, a coordinate system e.g., polar or cartesian applied to an area 106 to specify locations and/or subareas 108, e.g., according to the coordinate system, translated to global latitude and longitude geo-coordinates, etc. of objects 114, identified from sensor data. Yet further, a computer could employ various techniques for fusing i.e., incorporating into a common coordinate system or frame of reference data from different sensors and/or types of sensors, e.g., lidar, radar, and/or optical camera data.

Based on identifying an object 114, including classifying the object 114, e.g., as another vehicle 104, a pedestrian, etc., the stationary node computer 116 can determine whether the object 114 may pose a risk to a vehicle 104 that has requested in been granted authorization to access a charging station 102. The stationary node computer 116 can then designate the object 114 as an object 114 to be tracked with respect to the vehicle 104. Further, the stationary node computer 116 may designate a plurality of objects 114 to be tracked with respect to a vehicle 104. The stationary node computer 116 can determine that an object 114 is an object 114 to be tracked with respect to a vehicle 104 based on a type of the object 114, an attribute of the object 114, and an attribute of the vehicle 104. A "type" of object 114 means a classification of the object 114 that identifies it as sharing features of certain other objects 114, while being distinguishable from yet other objects 114, i.e., objects 114 of different types. Object 114 types include, for example, vehicles 104, pedestrians, bicycles, motorcycles, charging stations 102, roadway or parking area 106 markings, pylons, guardrails, etc. An "attribute" in this context means one or more physical measurements. For example, an attribute of an object 114 could be its speed, velocity (a vector describing speed and direction), size (e.g., height, width, and/or length), location, etc. Further, an attribute of an object 114 could be a change of such values, e.g., a change in speed, a change in direction or location, etc.

The stationary node computer 116 may be programmed to determine a risk level of the object 114, e.g., high or low, a risk scored on a scale of 1 to 10, etc., wherein the data about the object 114 includes the risk level of the object 114. Determining a risk of an object 114 with respect to a vehicle 104 can include determining a risk level of the object 114. For example, a risk level of an object 114 could be a binary value, e.g., low or high, zero or one (i.e., risk to vehicle 104 not flagged, risk to vehicle 104 flagged), etc. In other examples, a risk level could be on some suitable scale. An object 114 can be determined to present risk with respect to a vehicle 104 based on a determination that the object 114 is not associated with the vehicle 104 For an object 114 to be associated with the vehicle 104 means that an identifier for the object 114 is stored in a list of one or more object 114 identifiers that are excluded from being identified as presenting a risk to the vehicle 104. Such object 114 identifier could be for a vehicle 104 occupant, and could include facial recognition or other biometric identification data, and/or could be for an occupant's mobile device 132.

Alternatively or additionally, an object 114 could be determined to present a risk to a vehicle 104 based on a location of the object 114. For example, an object 114 of risk to a first vehicle 104 could be a user who has exited a second vehicle 104, and is moving through the area 106 of the charging station system 100, and is not in an expected location of the charging station system 100, i.e., has a trajectory or location more than a predetermined distance from the second vehicle 104 and/or from a facility such as a restroom. Yet further for example, a stationary node computer 116 could monitor a trajectory of an object 114, and determined that the trajectory posed a risk to a vehicle 104 based on the trajectory, if extrapolated, passing within a predetermined distance of the vehicle 104, wherein the object 114 is not associated with the vehicle 104, and is not associated with any other vehicle 104 on or within a predetermined distance of the trajectory. Yet further, the stationary node computer 116 could monitor a trajectory of an object 114 to determine that the trajectory is erratic, e.g., changes speed and/or direction more than a threshold number of times or amount, and could then identify the object 114 as a risk to a vehicle 104 based on the erratic trajectory.

Upon identifying an object 114 to be tracked with respect to a vehicle 104, the stationary node computer 116 can then track the object 114. In the context of this disclosure, to "track" an object 114 means to observe the object 114 so long as it is within a field of view of one or more stationary sensors 112 in the area 106, and/or until tracking is terminated, e.g., because the object 114 is no longer an object 114 of interest. Tracking in this context further means that the stationary node computer 116 can continuously or periodically analyze data from stationary sensors 112 and/or from various vehicle sensors 120 (received via V2X communications). Moreover, tracking an object 114 thus includes updating a determination of whether the object 114 is a risk to a vehicle 104 with respect to which is tracked. For example, if the object 114 is a pedestrian associated with a second vehicle 104, and the pedestrian enters that second vehicle 104, then the stationary node computer 116 may remove the pedestrian as an object 114 to be tracked with respect to the first vehicle 104.

An object 114 can be tracked with respect to more than one vehicle 104. Further, an object 114 can be tracked by the stationary node computer 116 with respect to all vehicles 104 in an area 106, i.e., with respect to the entire area 106. For example, if a vehicle 104 enters the area 106 without authorization to access a charging station 102, and is otherwise unassociated or unidentified as a vehicle 104 that can enter the area 106, then that vehicle 104 may be tracked with respect to all vehicles 104 in the area 106. Similarly, an unidentified pedestrian and/or a pedestrian not associated with any vehicles 104 in the area 106, could be so tracked.

Upon identifying an object 114 to be tracked with respect to a vehicle 104, the stationary node computer 116 can transmit data about the object 114 to the vehicle 104 and/or a mobile device 132 of a user according to a suitable communications mechanism such as mentioned above. For example, a vehicle 104 human machine interface or an interface of a user device could allow a user to request to receive a video stream and/or images of an object 114 identified as having a risk for a vehicle 104. That is, the data about the object 114 can include image data showing the object 114. Further, image data about an object 114 can be provided to a vehicle computer 118 and/or mobile device 132 upon a determination that an object 114 is an object 114 to be tracked with respect to a vehicle 104. For example, when responding to a request for authorization and providing the data about one or more objects 114 to be tracked along with the authorization, the stationary node computer 116 could also provide a still or video image of an object 114 or objects 114 to be tracked, as mentioned above. Alternatively or additionally, as also mentioned above a mobile device 132 or vehicle computer 118 in communication with the stationary node computer 116 could request image data of one or more identified objects 114 being tracked with respect to the vehicle 104.

The stationary node computer 116 is further programmed to provide the data about the object 114 in a map of the area 106. A vehicle computer 118 and/or mobile device 132 can be programmed to request and/or receive the map. The stationary node computer 116 can generate the map based on a coordinate system such as a Cartesian coordinate system for the area 106 of the charging station system 100 and/or a global coordinate system. For example, a global coordinate system can be a GPS Global Positioning System sensor that receives data from GPS satellites. The Global Positioning System GPS is a global navigation satellite system. The satellites broadcast time and geolocation signals. The GPS sensor can determine a location of the vehicle 104, i.e., latitude and longitude according to a global coordinate system, based on receiving the time and geolocation signals from multiple satellites simultaneously. However, precision of GPS coordinates may not be as high as desired for describing locations and/or movement of objects 114 in an area 106 of a charging station 102. Various location sensors such as cameras, lidar's, radars, etc., can provide data to classify objects 114 in determine object 114 attributes, including object 114 locations with respect to a local coordinate system for the area 106. A description of an object 114 and its location can be included as map data stored in a memory of or accessible by the stationary node computer 116, and can be provided to a vehicle 104. For example, map data can be in a conventional form that includes coordinates of the coordinate system along with an identification of an object 114 or objects 114 at the respective coordinates, e.g., object 114 types and/or attributes as mentioned above.

The stationary node computer 116 can be further programmed to actuate one or more of the stationary sensors 112 to track an object 114, as explained above. For example, upon identifying an object 114 as having a risk level with respect to a vehicle 104 that exceeds the risk threshold, the stationary node computer 116 may initiate tracking of the object 114. Examples of objects 114 to be tracked include pedestrians, bicycles, motorcycles, and could also include a second vehicle 104, i.e., another vehicle 104 in the area 106 besides the vehicle 104 that has requested and received authorization, and with respect to which the stationary node computer 116 is tracking objects 114. In one example, the stationary node computer 116 is further programmed to identify a second vehicle 104 as an object 114 to be tracked based on determining that the second vehicle 104 lacks a registration at the charging station 102. That is, the stationary node computer 116 can determine that the second vehicle 104 has not requested, and/or has not received, authorization to access a charging station 102, and/or that the second vehicle 104 cannot be identified, e.g., by a license plate or the like, as a vehicle 104 authorized in the area 106.

The stationary node computer 116 can determine the object 114 to be tracked with respect to a vehicle 104 according to various criteria. One such criterion for tracking an object 114 can be its location, e.g., whether the object 114 is within a predetermined distance of a vehicle 104. In one example, the stationary node computer 116 can identify as a person outside of the vehicle 104 as the object 114 to be tracked with respect to the vehicle 104. That is, a pedestrian in the area 106 of a charging station system 100 outside of the vehicle 104 may pose a risk to vehicles 104 in the area 106. In one example, upon identifying a person outside of the vehicle 104 within a predetermined distance (e.g., 5 meters) of the vehicle 104, and moving toward the vehicle 104 and/or moving in an erratic trajectory, may be identified as posing a risk to the vehicle 104. Further, the stationary node computer 116 may identify an individual, e.g., using image recognition or the like when the individual is in or exiting a second vehicle, as associated with the second vehicle 104 in the area 106. The stationary node computer may then, based on the individual being associated with an authorized second vehicle 104, determine that the person is not an object 114 to be tracked with respect to a vehicle 104.

As mentioned above, the stationary node computer 116 can identify the object 114 to be tracked based on a trajectory of the unauthorized object 114. For example, by recording locations of an object 114 over time, the stationary node computer 116 can determine whether a path of the object 114 is likely to intersect with, or come within a predetermined distance (e.g., two or 3 m) of, a vehicle 104. The stationary node computer 116 can then, based on such determination, designates the object 114 as an object 114 of interest for the vehicle 104. In some examples, stationary node computer 116 may first confirm that the object 114, such as a pedestrian or bicycle, is not associated with another authorized vehicle 104.

As mentioned above, the stationary node computer 116 can exclude persons associated with authorized vehicles 104 as objects 114 to be tracked with respect to other vehicles 104. In one example, the stationary node computer 116 identifies a user of a vehicle 104 upon detecting the user exiting the vehicle 104, whereupon that user can then be excluded as an object 114 to be tracked. Users exiting the vehicle 104 can be identified based on biometric identification (e.g., image recognition) and/or identification of a transmission, e.g., including a device identifier, from a user's mobile device 132. However, in some examples the object 114 to be tracked can be inside the vehicle 104. For example, stationary node sensors may detect a plurality of vehicle 104 occupants, and could, based on prestored information about the vehicle 104, retrieve a record of a number of occupants expected in the vehicle 104 and/or information identifying the occupants, e.g., images, mobile device 132 identifiers, etc. Upon determining that an occupant of a vehicle 104 was not expected, the stationary node computer 116 could identify the occupant inside the vehicle 104 as an object 114 to be tracked.

Once data about an object 114 or objects 114 to be tracked, e.g., on a map specifying object 114 locations, types, and/or attributes, is received in the vehicle computer 118, the vehicle computer 118 can determine a risk level of the object 114 based on the data received from the stationary node computer 116. Alternatively or additionally, the data about the object 114 received from the stationary node computer 116 can specify a risk level, and/or the vehicle computer 118 can assign the object 114 a high risk level based on the identification of the object 114 in the data from the stationary node computer 116. Further, the vehicle computer 118 can use data from vehicle sensors 120 in addition to data from the stationary node computer 116 to determine a risk level of an object 114. For example, a vehicle computer 118 could use camera image or lidar data to track an object 114 over time, and could determine that a path of the object 114 will not intersect with the vehicle 104. In such case, the object 114, even if indicated in the data from the stationary node computer 116, for be determined by the vehicle computer 118 to represent a low or no risk to the vehicle 104. Similarly, the vehicle computer 118 could determine whether a person outside the vehicle 104 can be identified as associated with the vehicle 104, and if so, can exclude the person as an object 114 to be tracked or as an object 114 of risk.

Upon determining that a risk level of an object 114 exceeds a risk threshold, the vehicle computer 118 can, e.g., by sending a command via the vehicle network 128, actuate a vehicle 104 component 124. For example, the vehicle computer 118 could cause lights to blink and/or a horn to sound, and/or could actuate steering, braking, and/or propulsion to avoid the object 114, etc. In another example, actuating a component 124 could include displaying on a screen included in a vehicle 104 HMI (human machine interface) a map of the area 106 showing at least one location of the object 114 based on the data about the object 114 received from the stationary computer.

As also mentioned above, data about an object 114 or objects 114 could be provided to a user's mobile computer, e.g., to display a map of the area 106 showing at least one location of the object 114 based on the data about the object 114 received from the stationary computer.

The system of claim 1, wherein the stationary node computer 116 is further programmed to determine an estimated time until the area 106 will be available for the vehicle 104 based on a number of other vehicles 104 waiting in a queue to access the area 106, and to provide the estimated time to the vehicle 104.

Example Processes

Figure 3:
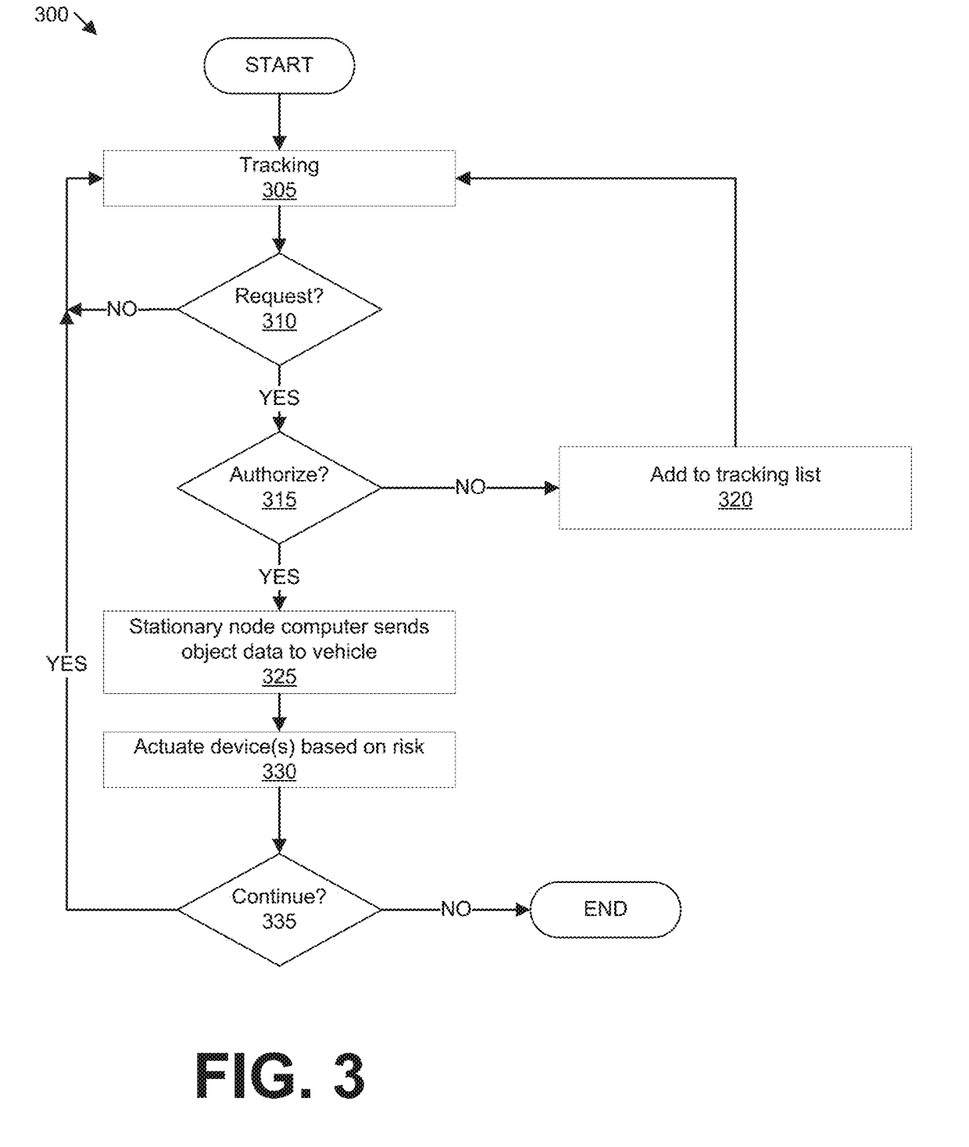
FIG. 3 illustrates an example process in which object tracking in a charging station system.

FIG. 3 illustrates an example process 300 in which object 114 tracking, including with respect to a vehicle 104, can be performed in the charging station system 100. Blocks of the process 300 may be carried out in a stationary node computer 116, charging station computers 110, and/or vehicles 104 and vehicle computers 118, as will be explained further below. Further, as noted above, operations ascribed to the stationary node computer 116 could be carried out by one or more charging station computers 110, e.g., if the stationary node computer 116 were omitted from the charging station system 100.

The process 300 begins in a block 305, in which the stationary node computer 116 performs monitoring of the area 106 of the charging station system 100, which may include tracking objects 114, e.g., based on a list or set of objects 114 to be tracked and/or based on detecting or being informed about unauthorized objects 114. For example, the stationary node computer 116 may include programming to receive data from stationary sensors 112 in an area 106, and to maintain a map of objects 114 in the area 106. The map could include authorized objects 114, e.g., authorized vehicles 104 and/or their occupants, as well as unauthorized objects 114, such as unauthorized vehicles 104, unauthorized pedestrians, bicycles, etc. As mentioned above, unauthorized objects 114 could be tracked with respect to all vehicles 104, or with respect to one or more specific vehicles 104. Further, authorized objects 114 could be tracked with respect to other authorized objects 114, e.g., a user of an authorized vehicle 104 could be tracked with respect to another authorized vehicle 104 based on the location, trajectory, etc. of the occupant. In some examples, any object 114 entering or in the area 106 may be added to the map (subject to filtering for objects 114 that are greater than a specified size, not of an excluded object 114 type such as a shopping bag blowing through the area 106, etc.). Then, if an object 114 leaves or is no longer in the area 106, the object 114 may be removed from the map.

Next, in a decision block 310, if the stationary node computer 116 determines that it has received a request to access a charging station 102 from a vehicle 104 approaching or entering the area 106, then a block 315 is executed next. Otherwise, the process 300 returns to (or remains in) the block 305.

Upon receiving the request to access a charging station 102 from a vehicle 104, the stationary node computer 116 determines in the decision block 315 whether to authorize the request. For example, a vehicle 104 may transmit an identifier stored by the stationary node computer 116 as an identifier of a vehicle 104 authorized to access a charging station 102, and/or the stationary node computer 116 may be programmed to authorize access of the charging station 102 based on provision of a digital token or the like. If the stationary node computer 116 does not identify the vehicle 104 as authorized, then a block 320 is executed next. If the stationary computer does identify the vehicle 104 as authorized, then a block 325 is executed next.

In the block 320, which may be omitted in some examples, the stationary node computer 116 may add the requesting vehicle 104 to a list or set of objects 114 being tracked with respect to the area 106. That is, the requesting vehicle 104 may be entering the area 106 and may further be unauthorized. If the unauthorized requesting vehicle 104 is detected by stationary sensors 112 and/or reported by authorized vehicles 104 based on V2X communications, then the stationary node computer 116 may add the unauthorized requesting vehicle 104 to the list or set of objects 114 being tracked. Following the block 320, the process 300 returns to the block 305.

In the block 325, the stationary node computer 116 sends the object 114 data, e.g., a map as described above, to a vehicle 104 and/or a user mobile device 132 associated with the vehicle 104, about objects 114 being tracked with respect to the vehicle 104 (which may include objects 114 being tracked generally with respect to the area 106, as described above).

Next, in the block 330, any one or more of the stationary node computer 116, charging station computers 110, and/or vehicle computers 118 may actuate one or more devices based on a risk level of an object 114 with respect to a vehicle 104 exceeding a threshold. For example, possible risk levels could be "low" and "high," whereupon a risk level exceeding the "low" risk level, i.e., a "high" risk level, could warrant actuating one or more devices. For example, a stationary node computer 116 and/or charging station computers 110 could actuate lights, sounds, etc. with respect to the area 106 or a specific charging station 102 subarea 108. Similarly, a vehicle computer 118 could actuate lights, sounds etc. based on an unauthorized object 114 near the vehicle 104, and/or the vehicle computer 118 could actuate a vehicle 104 component 124 such as steering, propulsion, and/or breaking to move the vehicle 104 away from an object 114 being tracked. Further, actuation of a device could be based on, in addition to a risk level, a type and/or location of an object 114 being tracked. For example, actuating a device could be based on a distance of an object 114 being tracked from a vehicle 104. Threshold distances for actuation of a device could be defined based on respective types of objects 114, e.g., a first distance from a vehicle 104 could warrant actuation of a charging station system 100 device and/or vehicle 104 device for a pedestrian object 114, a second distance could warrant actuation of a device for an unauthorized vehicle 104 object 114, etc. Another example, violation of a threshold distance from a vehicle 104 by any object 114 being tracked could warrant actuation of a device.

Following the block 330, any decision block 335, the process 300 may end, e.g., if a charging station system 100 is no longer accessible to any vehicles 104, a stationary node computer 116 is turned off, no objects 114 are present in an area 106 to be tracked, etc. However, the process 300 may continue by returning to the block 305.

Figure 4:
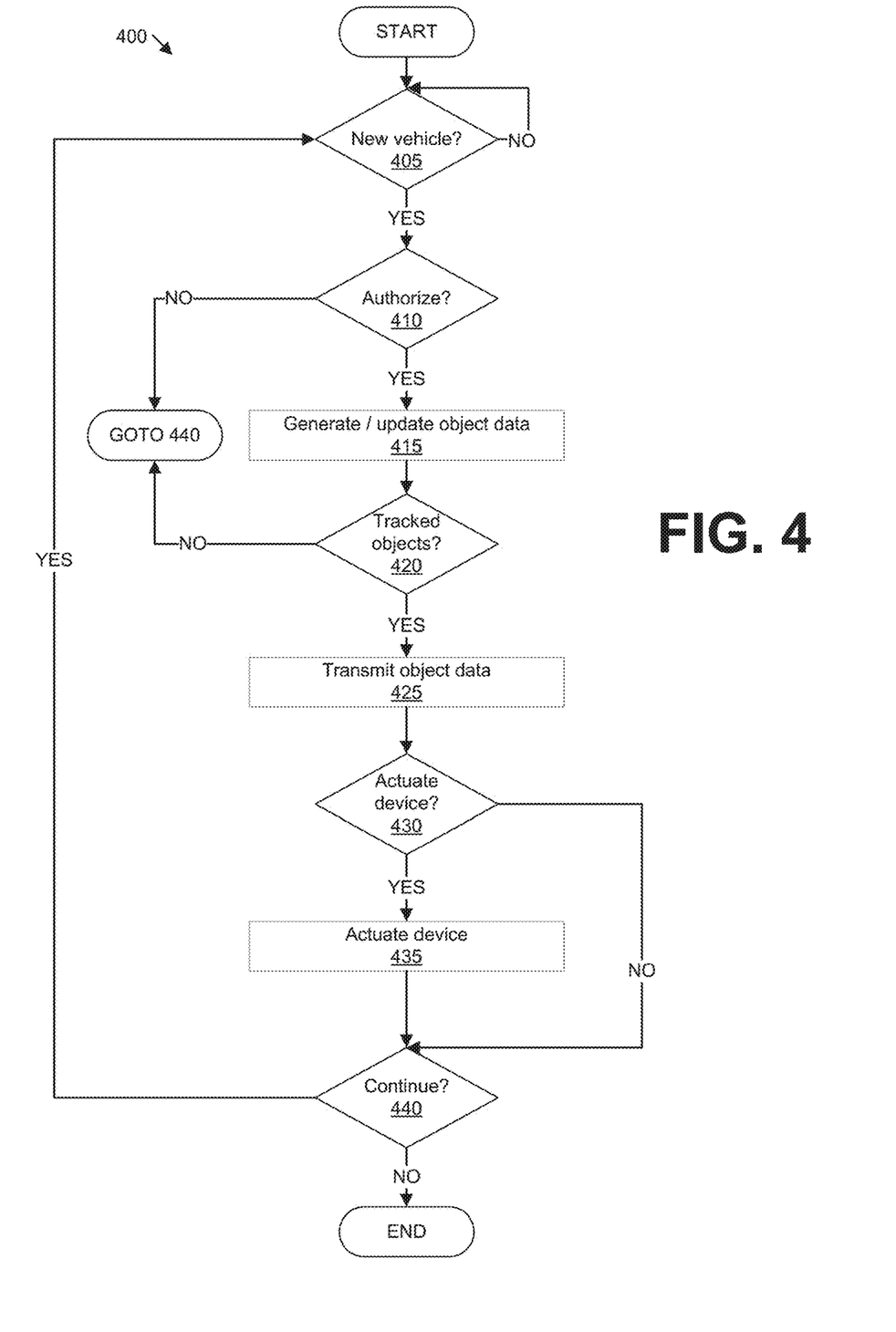
FIG. 4 is an example process for a stationary node computer to authorize vehicles to access a charging station and to track objects with respect to authorized vehicles.

FIG. 4 is an example process 400 for a stationary node computer 116 to authorize vehicles 104 to access a charging station 102 and tracked objects 114. The process 400 can be carried out according to programming of a stationary node computer 116 and/or charging station computers 110. As noted above, operations of the stationary node computer 116 could be carried out in some examples by one or more charging station computers 110.

The process 400 begins in a block 405, in which the stationary node computer 116 determines whether it has received a request to access a charging station 102 from a vehicle 104 entering or approaching the area 106. If not, the process 400 returns to the block 405. If so, the process 400 proceeds to a decision block 410.

In the block 410, the stationary node computer 116 determines whether the vehicle 104 from which the request was received in the block 410 is to be authorized to access a charging station 102. For example, as described above, the vehicle 104 may transmit an identifier stored by the stationary node computer 116 as the identifier of a vehicle 104 to be authorized. Alternatively or additionally, the stationary node computer 116 could in turn transmit the identifier and/or the request to a remote computer (not shown) that maintains a registry or list of authorized vehicles 104 for a plurality of charging station systems 100. Yet further alternatively or additionally, the stationary node computer 116 could receive a digital token or the like, and/or could authorize a payment transaction, to then authorize a vehicle 104 to access a charging station 102. Moreover, the stationary node computer 116 could receive from a vehicle 104 or could access based on a vehicle 104 identifier a type of charging station 102 needed by the vehicle 104 to assign a particular charging station 102 to the vehicle 104. Alternatively or additionally, the stationary node computer 116 could use suitable techniques to assign vehicles 104 to charging stations 102 to minimize a wait time of respective vehicles 104 in the charging station system 100. If the stationary node computer 116 determines to authorize the vehicle 104, then the stationary node computer 116 transmits a message to the vehicle 104 indicating the authorization, and stores identifying information about the vehicle 104 (e.g., the vehicle 104 identifier, data about the vehicle 104 such as a vehicle 104 type, a license plate state and/or number, an image of the vehicle 104 obtained from stationary sensors 112 or that was prestored, etc.) in a set of currently authorized vehicles 104 for the area 106 of the charging station system 100. The process 400 then proceeds to a block 415. If, on the other hand, the stationary node computer 116 determines not to authorize the vehicle 104, then the process 400 proceeds to a block 440. Further, as discussed above, the stationary node computer 116 may include an unauthorized vehicle 104 as a tracked object 114.

In the block 415, the stationary node computer 116 updates its object 114 data for the area 106. For example, the stationary node computer 116 could add a just-authorized vehicle 104 to a map of object 114 data for the area 106, and/or any just-detected objects 114 in the area 106. Further, the stationary node computer 116 could update locations, speeds, and/or directions of objects 114, and further could add and/or update data about respective object 114 types, etc. For example, the stationary node computer 116 can generate a map showing locations and/or trajectories of objects 114 in the area 106 along with other data, e.g., data about a type of respective objects 114. Yet further, data about objects 114 in the area 106 can include data identifying persons, e.g., pedestrians, vehicle 104 occupants, etc., as authorized or unauthorized for the area 106. Unauthorized persons, as noted above, can be objects 114 tracked with respect to vehicles 104. The data about objects 114 in the area 106 can be generated using data from stationary sensors 112, but may also be generated from data provided by vehicles 104, e.g., via V2X communications.

Next, in a block 420, the stationary node computer 116 determines whether its data about objects 114 in the area 106 includes any objects 114 being tracked, e.g., with respect to one or more vehicles 104. If yes, then a block 425 is executed next. Otherwise, the process 400 proceeds to the block 440.

In the block 425, the stationary node computer 116 transmits object 114 data about objects 114 being tracked to respective vehicles 104 for which the objects 114 are being tracked.

Next, in a block 430, the stationary node computer 116 determines whether to actuate a device based on one or more objects 114 being tracked and a risk of the object 114 exceeding a threshold risk with respect to an authorized vehicle 104. For example, as explained above, if an object 114 is of a specified type, e.g., unauthorized vehicle 104 or pedestrian, and is within a specified distance and/or on a specified trajectory with respect to an authorized vehicle 104, the stationary node computer 116 could actuate lights and/or sounds, and/or could transmit a message to the authorized vehicle 104 about the unauthorized object 114. Alternatively or additionally, in another example, the stationary node computer 116 could transmit a message to a remote computer (not shown) via the wide area network 130 indicating a risk posed by an unauthorized object 114. If the stationary node computer 116 determines to actuate a device, then the process 400 proceeds to a block 435. Otherwise, the process 400 proceeds to the block 440.

Next, in a block 435, the stationary node computer 116 actuates one or more devices as determined in the block 430.

Next, in a block 440, the stationary node computer 116 determines whether to continue the process 400, and/or the process 400 may be ended, e.g., because the stationary node computer 116 is powered down, put in a rest mode, etc., e.g., because the charging station system 100 is being shut down, undergoing maintenance, etc. If the process 400 is to continue, then the process 400 returns to the block 405. Otherwise, the process 400 ends.

Figure 5:
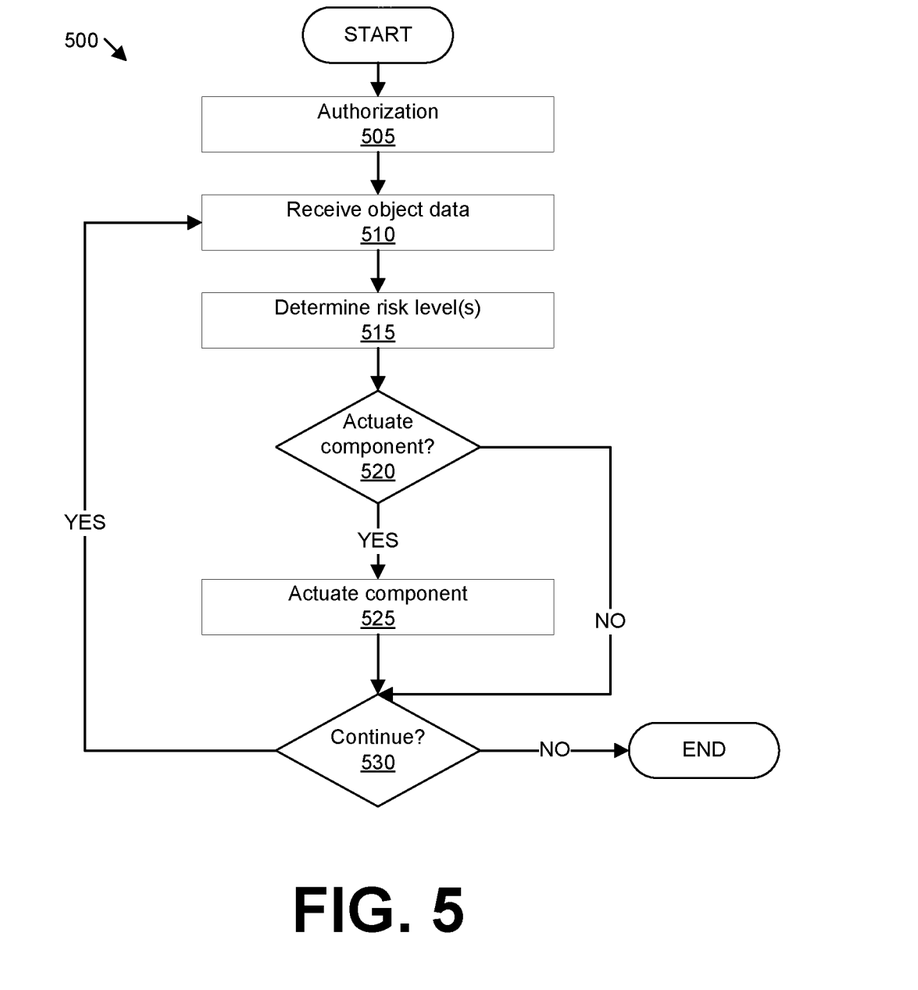
FIG. 5 is an example process for a vehicle in an area of the charging station system.

FIG. 5 is an example process 500 for a vehicle 104 in an area 106 of the charging station system 100. The process 500 can begin in a block 505, in which a vehicle computer 118 sends a request to a stationary node computer 116 as described above. Upon the stationary node computer 116 authorizing the request, the process 500 can then proceed to a block 510. Although not shown, if the stationary node computer 116 declines the request, the process 500 may end following the block 505.

In the block 510, the vehicle 104 receives object 114 data, e.g., a map of an area 106 of the charging station system 100, as described above.

Next, in a block 515, the vehicle computer 118 determines respective risk levels for objects 114 in the object 114 data received in the block 510. Risk levels could be indicated in the object 114 data, and/or the vehicle computer 118 could determine risk levels. For example, the vehicle computer 118 could determine a "high" risk level for unauthorized objects 114 within a specified distance of the vehicle 104. Alternatively or additionally, the vehicle computer 118 could determine a "high" risk level for unauthorized objects 114 and/or authorized objects 114 having a trajectory within a predetermined distance of the vehicle 104, or that is erratic, e.g., changing speed and/or direction more than a specified number of times within a predetermined time, etc.

Next, in a block 520, the vehicle computer 118 determines whether to actuate a component 124 based on a risk level determined in the block 515. The vehicle computer 118 may also determine whether to actuate components 124 based on a type of object 114 or other data about an object 114. For example, the vehicle computer 118 could determine to actuate an audio component 124 to output a sound outside the vehicle 104, and/or light components 124 to actuate lights outside the vehicle 104, based on an unauthorized person being within a predetermined distance, e.g., three meters, of the vehicle 104. Alternatively or additionally, the vehicle computer 118 could determine to actuate the communication module 126 to transmit a message to the stationary node computer 116 and/or, via the wide area network 130, a remote computer (not shown) indicating a high risk level of an object 114. Yet further alternatively or additionally, the vehicle computer 118 could actuate one or more components 124 to move the vehicle 104, e.g., to increase a distance from an unauthorized object 114, as discussed above. If the vehicle computer 118 determines to actuate a component 124, then a block 525 is executed next. Otherwise, the process 500 proceeds to the block 530.

Next, in a block 525, the vehicle computer 118 actuates a component 124 as determined in the block 520.

In the block 530, which may follow the block 520 or the block 525, the vehicle computer 118 determines whether to continue the process 500. For example, the vehicle 104 may complete a charging process at a charging station 102, the vehicle 104 may exit the area 106, etc. If the process 500 is determined not to continue, then the process 500 ends following the block 530. Otherwise, the process 500 returns to the block 510.

Conclusion

Described above is a system, comprising: a plurality of vehicle charging stations disposed within an area; a plurality of stationary sensors disposed with respective fields of view of the area; and a stationary node computer including a first processor and a first memory and communicatively coupled to the charging station and the stationary sensors. The first memory stores instructions executable by the first processor such that the stationary computer is programmed to: authorize a request from a vehicle to access the charging station; identify an object, detected in the area in data from one or more of the stationary sensors, to be tracked with respect to the vehicle. The object to be tracked with respect to the vehicle is identified based on a type of the object, an attribute of the object and an attribute of the vehicle. The stationary computer is further programmed to transmit data about the object to the vehicle.

The stationary node computer may be further programmed to provide the data about the object in a map of the area, to determine a risk level of the object, wherein the data about the object includes the risk level of the object, and/or to actuate one or more of the stationary sensors to track the object. The risk level may be one of high or low.

The object may be a second vehicle, and the stationary node computer may be further programmed to identify the second vehicle as the object to be tracked based on determining that the second vehicle lacks a registration at the charging station. The object to be tracked can be a person outside of the vehicle. The object to be tracked may be one of a plurality of objects to be tracked in the area. The object to be tracked may be inside the vehicle.

The data about the object may include image data showing the object. The stationary sensors can include at least one of a visible light camera, an infrared camera, a radar, a lidar, and an ultrasonic sensor.

The stationary node computer may be further programmed to identify the object to be tracked based on a trajectory of the unauthorized object, and/or to identify the object to be tracked based on a location of the object, and/or to exclude a user of the vehicle as the object to be tracked upon detecting the user exiting the vehicle, and/or to exclude a person as the object to be tracked upon identifying the person via biometric identification or identification of a user device, and/or to determine an estimated time until the area will be available for the vehicle based on a number of other vehicles waiting in a queue to access the area, and to provide the estimated time to the vehicle.

The system may further comprise a vehicle computer in the vehicle, including a vehicle computer processor and a vehicle computer memory, and communicatively coupled to vehicle sensors, the vehicle computer memory storing instructions executable by the vehicle computer processor such that the vehicle computer is programmed to: receive, in response to the request to access the charging station, the data about the object to be tracked; and determine a risk level of the object based on the data about the object received from the stationary computer and data from one or more of the vehicle sensors. The vehicle computer may be further programmed to actuate a vehicle component based on determining that a risk level for the object exceeds a risk threshold, and/or to display a map of the area showing at least one location of the object based on the data about the object received from the stationary computer.

The system may further comprise a mobile computer, including a mobile computer processor and a mobile computer memory, the mobile computer memory storing instructions executable by the mobile computer processor such that the mobile computer is programmed to display a map of the area showing at least one location of the object based on the data about the object received from the stationary computer.

A method may be carried out according to program steps of one or more of the computers as described above.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The adjectives first and second are used throughout this document as identifiers and, unless explicitly stated otherwise, are not intended to signify importance, order, or quantity.

The term exemplary is used herein in the sense of signifying an example, e.g., a reference to an exemplary widget should be read as simply referring to an example of a widget.

Use of in response to, based on, and upon determining herein indicates a causal relationship, not merely a temporal relationship.

Computer executable instructions may be compiled or interpreted from computer programs created using a variety of programming languages and/or technologies, including, without limitation, and either alone or in combination, Java®, C, C++, Visual Basic, JavaScript®, Perl®, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

The invention claimed is:

1. A system, comprising:
vehicle charging stations disposed within an area;
stationary sensors disposed with respective fields of view of the area;
a stationary node computer including a first processor and a first memory and communicatively coupled to the charging stations and the stationary sensors, the first memory storing instructions executable by the first processor such that the stationary node computer is programmed to:
authorize a request from a vehicle to access the charging station;
identify an object, detected in the area in data from one or more of the stationary sensors, to be tracked with respect to the vehicle;
wherein the object to be tracked with respect to the vehicle is identified based on a type of the object, an attribute of the object and an attribute of the vehicle; and
transmit data about the object to the vehicle.

2. The system of claim 1, wherein the stationary node computer is further programmed to provide the data about the object in a map of the area.

3. The system of claim 1, wherein the stationary node computer is further programmed to determine a risk level of the object, wherein the data about the object includes the risk level of the object.

4. The system of claim 3, wherein the risk level is one of high or low.

5. The system of claim 1, wherein the stationary node computer is further programmed to actuate one or more of the stationary sensors to track the object.

6. The system of claim 1, wherein the object is a second vehicle, and the stationary node computer is further programmed to identify the second vehicle as the object to be tracked based on determining that the second vehicle lacks a registration at the charging station.

7. The system of claim 1, wherein the data about the object includes image data showing the object.

8. The system of claim 1, wherein the stationary sensors include at least one of a visible light camera, an infrared camera, a radar, a lidar, and an ultrasonic sensor.

9. The system of claim 1, wherein the object to be tracked is a person outside of the vehicle.

10. The system of claim 1, wherein the stationary node computer is further programmed to identify the object to be tracked based on a trajectory of an unauthorized object.

11. The system of claim 1, wherein the stationary node computer is further programmed to identify the object to be tracked based on a location of the object.

12. The system of claim 1, wherein the stationary node computer is programmed to exclude a user of the vehicle as the object to be tracked upon detecting the user exiting the vehicle.

13. The system of claim 1, wherein the stationary node computer is programmed to exclude a person as the object to be tracked upon identifying the person via biometric identification or identification of a user device.

14. The system of claim 1, wherein the stationary node computer is further programmed to determine an estimated time until the area will be available for the vehicle based on a number of other vehicles waiting in a queue to access the area, and to provide the estimated time to the vehicle.

15. The system of claim 1, wherein the object to be tracked is one of a plurality of objects to be tracked in the area.

16. The system of claim 1, wherein the object to be tracked is inside the vehicle.

17. The system of claim 1, further comprising a vehicle computer in the vehicle, including a vehicle computer processor and a vehicle computer memory, and communicatively coupled to vehicle sensors, the vehicle computer memory storing instructions executable by the vehicle computer processor such that the vehicle computer is programmed to:

receive, in response to the request to access the charging station, the data about the object to be tracked; and determine a risk level of the object based on the data about the object received from the stationary node computer and data from one or more of the vehicle sensors.

18. The system of claim 17, wherein the vehicle computer is further programmed to:

actuate a vehicle component based on determining that the risk level for the object exceeds a risk threshold.

19. The system of claim 17, wherein the vehicle computer is further programmed to display a map of the area showing at least one location of the object based on the data about the object received from the stationary node computer.

20. The system of claim 1, further comprising a mobile computer, including a mobile computer processor and a mobile computer memory, the mobile computer memory storing instructions executable by the mobile computer processor such that the mobile computer is programmed to display a map of the area showing at least one location of the object based on the data about the object received from the stationary node computer.

* * * * *